Feb. 27, 1968 — S. R. RICH — 3,371,059
MONOMER STRIPPING
Filed June 4, 1965 — 2 Sheets-Sheet 1
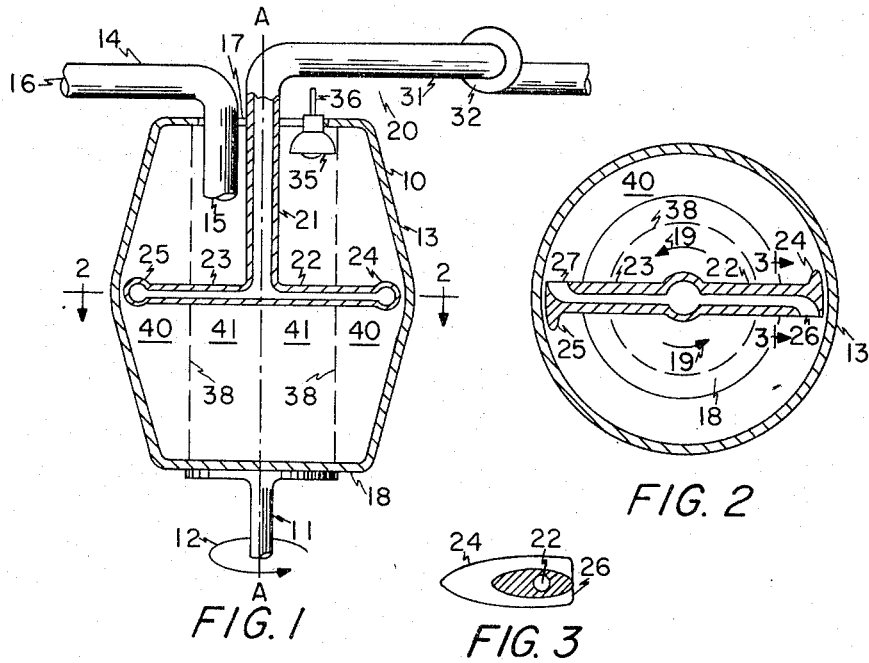
FIG. 1
FIG. 2
FIG. 3
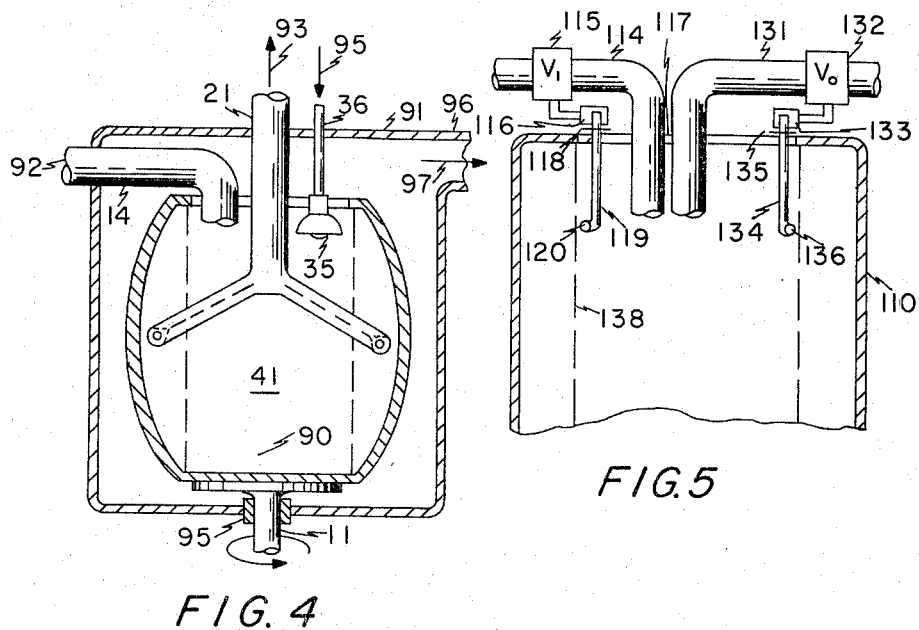
FIG. 4
FIG. 5
INVENTOR.
STANLEY R. RICH
BY
ATTORNEY Feb. 27, 1968  S. R. RICH  3,371,059
MONOMER STRIPPING Filed June 4, 1965  2 Sheets-Sheet 2

INVENTOR.
STANLEY R. RICH
BY
ATTORNEY

United States Patent Office 3,371,059
Patented Feb. 27, 1968

3,371,059
MONOMER STRIPPING
Stanley R. Rich, West Hartford, Conn., assignor to Teknika, Inc., Hartford, Conn., a corporation of Delaware
Continuation-in-part of application Ser. No. 260,177, Feb. 21, 1963. This application June 4, 1965, Ser. No. 461,248
8 Claims. (Cl. 260—29.6)

This invention relates to the treatment of liquids to separate gas and more particularly to methods and means for separating monomer gas from a liquid plastic latex without simultaneously separating solid components from the liquid.

This application is a continuation in part of application Ser. No. 260,177, entitled Liquid Treatment, filed Feb. 21, 1963 now U.S. Patent 3,213,592.

Many liquids, particularly those containing suspended solids, such as paper coatings, those having proteinaceous components, and latices, produce types of foam, when agitated, stirred or otherwise subjected to action which will cause gas to become entrained in them, which types are tenacious and difficult to eliminate with techniques thus far available. This is believed to be due to the fact that such types of foam and gas entrainment are constructed of bubbles having skins characterized by a high order of surface strength, and frequently having the regions between them filled with liquid. Such a combination of bubbles having a strong skin with the regions between them filled to a substantial extent with liquid, stubbornly resists squeezing, or vibrating the foam, and even treating it with heat and vacuum, or the combination of any or all of these, at levels or in quantities which will not at the same time be injurious to the liquid being treated.

A particular problem exists in the production of polymeric latices with removing residual unpolymerized monomer. Heating to the vaporization temperature of the monomer results in a gradual dissipation of the monomer over an extended period, but, as in any commercial product, time costs and an undesirably high residual monomer remains even after many hours. Residual monomer has many deleterious effects on a polymer. For example it lowers the strength characteristics, produces internal bubbles, and reduces resistance to environmental conditions.

It is one of the principal objects of the present invention to strip unpolymerized monomer from a polymer latex without bringing about injury or damage to the latex. More particularly, it is a principal object of the invention to define a method of removing residual monomer and other relatively volatile components from a polymeric liquid with novel applications of heat, elastic wave energy, and dynamic forces, and to provide novel methods and means to apply gas-borne elastic wave energy to this purpose.

According to the invention in one of its general aspects, a liquid containing foam or entrained gas is treated first to separate the foam or gas from the body of the liquid, and then, after separation from the liquid, the foam is broken by elastic wave energy. I have discovered that if a mass of foam bubbles intersticially filled with liquid is first treated to drain liquid from the bubbles, so that the foam bubbles become in effect cells filled and/or surrounded essentially only with a gas, it becomes a relatively easy matter to break the foam bubbles with elastic wave energy, no matter how tough or tenacious the bubble skins may be. Conveniently, foam, along with gas which may be entrained in a liquid, is separated from the liquid according to the invention by centrifugation, whereby the foam is removed from the body of the liquid. Then, elastic wave energy is applied to the collected foam only. Thus, more particularly, the invention contemplates the method of separating foam and/or gas from a liquid by subjecting liquid bearing the same to centrifugation, and subjecting the foam to elastic wave energy. Apparatus according to the invention comprises means to centrifuge a liquid and, in combination therewith, means to apply elastic wave energy to the central or axial region of the centrifuge means.

When a liquid surface is exposed to a high level of elastic wave sonic energy, I have discovered that the surface is perturbed in a way to rupture the gas-liquid interface so that entrained gas or dissolved gas is more readily released. Thus it is a specific object of the invention to set forth compatible conditions and to define a technique under which and whereby a polymeric liquid can be freed of unpolymerized monomer content with the use of elastic wave energy.

The invention will now be described with reference to the accompanying drawings, wherein:

FIG. 1 is a vertical axial section of a centrifugal separator according to the invention;

FIG. 2 is a cross-section along line 2—2 of FIG. 1;

FIG. 3 is a cross-sectional view of a part of FIG. 1 taken along line 3—3 in FIG. 2;

FIG. 4 is a vertical axial section of another embodiment of the invention;

FIG. 5 illustrates partly schematically a means to control the invention for continuous operation; and, FIG. 6 is a diagrammatic illustration of apparatus in accordance with still another embodiment of the invention described in specific relation to the method of monomer stripping.

Figure 6:
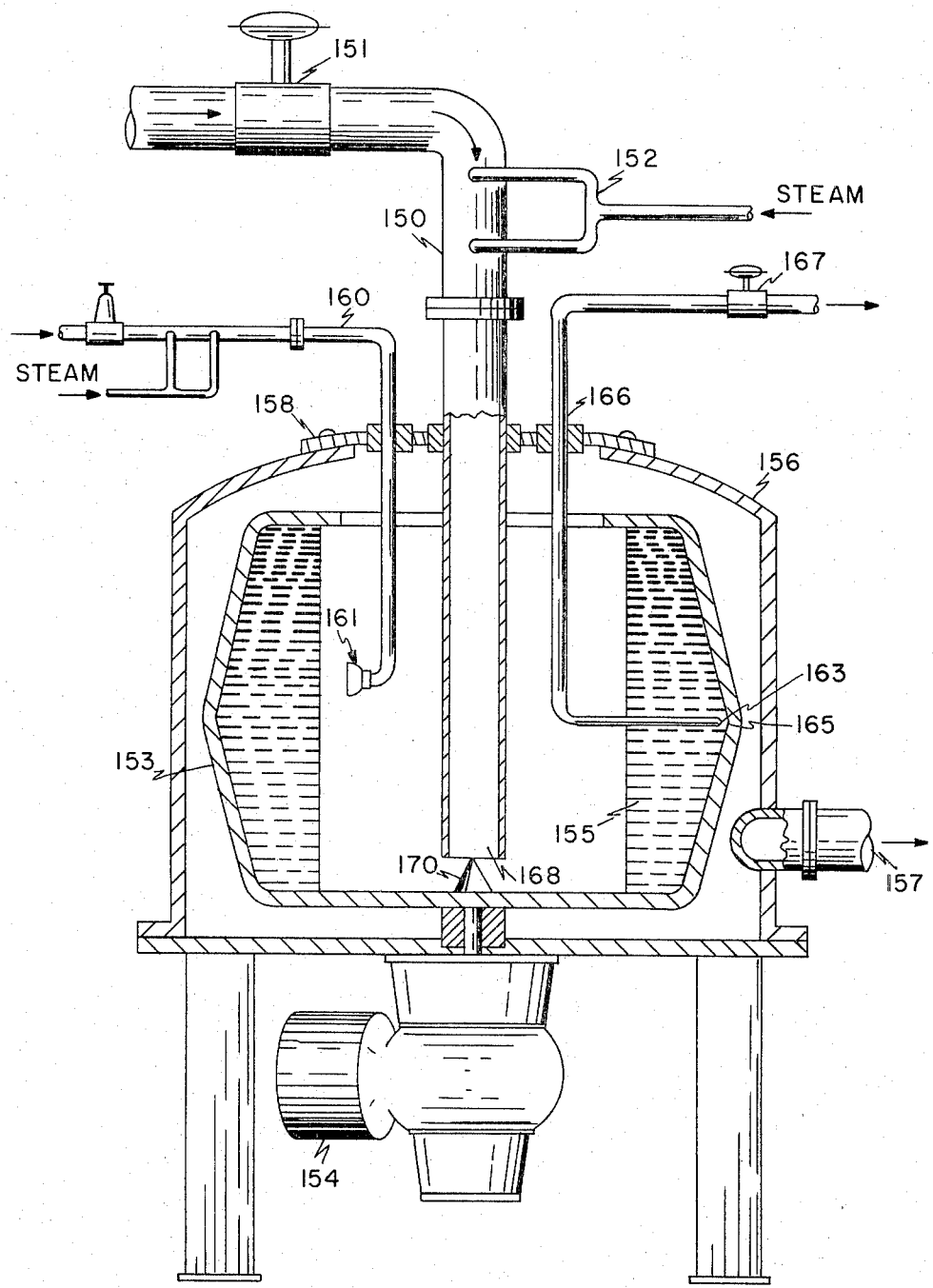

Referring to FIGS. 1, 2 and 3, a rotatable tub 10, open at the top 17 and having the shape of a figure of revolution around an axis A—A which is vertically disposed, is mounted at the bottom 18 on a shaft 11 which may be turned by a suitable prime mover (not shown), such as an electric motor, to rotate the tub around the axis A—A as is indicated by the curved arrow 12 in FIG. 1, and curved arrows 19 in FIG. 2. The tub has side walls tapered toward a region 13 of larger diameter than the remainder of the tub. An input pipe 14 is disposed at the top 17 of the tube with its discharge end 15 oriented to discharge into the tub through the open top 17. The remaining end 16 of the input pipe will in practice be connected to a source (not shown) of gas-bearing liquid to be treated.

An output pipe assembly generally designated 20, comprises a vertical output pipe 21 having mounted to its lower end a pair of cross-pipes 22 and 23 extending in opposite directions therefrom diametrically across the tub 10 in the wider region 13. Each cross-pipe has an external cross-sectional shape which is sharply stream-lined, as is indicated in FIG. 3, which shows a cross-section of the first cross-pipe 22. Each cross-pipe 22 and 23 has at its free end a stream-lined scoop 24 and 25, respectively, oriented with its mouth 26, 27 respectively opening into the oncoming liquid which may be present in the tub during rotation thereof in the direction of the arrows 12, 19. The first scoop 24 is shown in side view in FIG. 3. The output pipe assembly is non-rotatably fixed on the axis A—A by a mounting (not illustrated) outside tub 10, and does not rotate with the tub. The vertical output pipe 21 communicates with a horizontal output pipe 31, which further communicates with a pump 32.

A generator 35 of gas-borne elastic wave energy is disposed in or near the open top 17 of the tub, oriented to radiate elastic wave energy through the top into the central axial region 41 therein. A feed pipe 36 is provided for bringing in driving gas to the generator 35 from a source (not shown). The generator 35 may be of any suitable type, such as a siren, or a hollow resonator type as exemplified by Amy Patent No. 1,980,171. The driving gas may be compressed air, nitrogen, or any other suitable gas; depending on the nature of the liquid being treated, in some cases steam (dry or wet) may be used.

In operation, the tub 10 is rotated about the axis A—A at a suitable angular velocity, for example as specified below, and liquid to be treated is introduced via the input pipe 14. The quantity of liquid is regulated so that it occupies the outer annular portion 40 of the interior of the tub, as demarcated for example by the vertical dashed lines 38, 38 in FIG. 1; these lines are a vertical section of an annular boundary 38, as is represented in FIG. 2. If one considers that, during rotation of the tub 10 centrifugal force throws the liquid to the annular region 40 of the tub outside the boundary 38, the boundary may be considered as the level of the liquid in the tub, referred to the "gravitational" force due to centrifugation. The central axial region 41 within the boundary 38, including the axis A—A, is then the region above the liquid level 38. During rotation of the tub 10, then, the liquid under treatment is maintained at the level 38 and the region 41 above the liquid is occupied by foam and/or gas components of the input liquid. An arrangement for maintaining a desired liquid level 38 during the continuous operation of the invention is described below in connection with FIG. 5.

The angular velocity of rotation of the tub is chosen so that foam and/or gas components of the input liquid will be readily separated by centrifugal force, but solids which may be suspended in the liquid (as set forth in Example I below) will not be significantly disturbed. The present invention takes advantage of the fact that the density ratio of liquid to gas is about 800/1, at "standard" conditions of atmospheric pressure and room temperature, whereas the greatest realizable density ratio between a solid and a liquid is about 20/1; and normal ratios are usually smaller than 3/1 in such materials as clay-bearing paper coatings. The expression for centrifugal force is the well-known relation:

$$F = \frac{w}{g} \frac{v^2}{r}$$

where (if all units are in the English system):

$F$ = force in poundals.
$W$ = weight in poundals of the rotating mass.
$g$ = 32.16 ft./sec.$^2$
$v$ = linear velocity in ft./sec., and
$r$ = radius in feet.

If, for example, the radius of the tub 10 is 0.75 ft. (9 inches) in the region 13, and the rotational velocity is 300 r.p.m., the linear velocity "v" at the outer periphery of the tub in the region 13 is $$v = \frac{300 \times 2\pi r}{60} \text{ ft./sec.}$$

$$= 10\pi r = 24 \text{ ft./sec. (approx.)}$$

The expression for centripetal acceleration "a" in uniform circular motion is $$a = \frac{v^2}{r}$$

In the present example $$\frac{v^2}{r} = \frac{24^2}{0.75} = 576 \times \frac{4}{3} = 192 \times 4$$

$$a = 768 \text{ ft./sec.}^2$$

$$= 24 \, g$$

Thus, in the present example, the centripetal acceleration produced at 300 r.p.m. is 24 $g$. The centrifugal acceleration may be termed "G." In general, $$G = \frac{v^2}{r} \times \frac{1}{g}$$

The liquid in the rotating tub 10 may be, for example, about 3 to 4 inches "deep," where the term "deep" refers to centrifugal "gravity" and is measured between the level 38 and the outer side walls of the tub. The pressure per square inch, due to centrifugal action, is due then to 3 to 4 inches of liquid times 24 (in the present example), which yields the equivalent of a liquid column about 6 to 8 feet in height, referred to the terrestrial vertical. Thus, if at 300 r.p.m. the pump 32 is capable of lifting liquid at least eight feet, it can pump liquid from the tub through the scoops 24 and 25 without regard to the relative motion between the liquid rotating in the tub 10 and the scoops. In the present embodiment (FIGS. 1–3) relative motion between the liquid in the "lower" centrifugal region 40 and the scoops 24 and 25 drives liquid into the scoops, so that use of the pump 32 may be optional.

Centrifugation at an angular velocity which produces centrifugal gravity G of the order of 10 to 150 $g$ (approximately) will readily separate gaseous and foam components from a liquid without noticeably disturbing a suspension of solids in the liquid, as may be found in a clay-bearing paper coating for example. When treating a liquid with such centrifugation, liquid is promptly drained from the walls and/or interstices of any foam that may be present with the liquid, and a substantially liquid-free foam is left in the inner axial region 41. Such a foam is easily broken with gas-borne elastic wave energy having an intensity of more than 0.1 watt per square centimeter (approximately), whereupon the gas contained in the foam bubbles is released and the liquid comprising the skin returns to the body of the liquid in the outer annular region 41. Thus, the liquid is all recaptured, or salvaged, and the gas is separated. The output from the output pipes 21–31 is for all practical purposes gas-free and foam-free liquid.

As is mentioned above, depending on the nature of the liquid being treated, in some cases steam may be used as the driving gas for the generator 35. I have found that some liquids, such as a paper coating containing solids in suspension, may, after treatment according to the present invention using air as the driving gas for the generator 35, evolve air upon standing. This happens about half an hour after the treatment, in which time a tight foam is spontaneously produced which approximately doubles the volume of the treated liquid. I have found further that if this same material, after spontaneously foaming, is treated again according to the invention, but this time using steam as the driving gas for the generator 35, the foam is completely broken, the volume of the liquid returns to its original volume and spontaneous generation of foam does not again occur. It is hypothesized that some entrained solids can apparently hold, either by adsorption or absorption, air used in driving the generator, which air is subsequently released into the liquid. The use of steam in place of air effectively excludes air from ambient region in tub 10 above the liquid, and in which the foam is disposed, thereby preventing the retention of air in the treated liquid. It has been found that any vapor which is compatible with the liquid under treatment can be used in place of steam. A compatible vapor used herein is one which does not chemically react or otherwise combine undesirably with the liquid under treatment so as to produce deleterious effects or hazardous conditions.

In FIG. 4, an embodiment of the invention according to FIG. 1, modified somewhat according to FIG. 4, and generally designated by the reference character 90, is enclosed in a housing 91. Liquid is introduced via the input pipe 14 through the housing wall, as is indicated by an arrow 92, and defoamed and/or degased liquid is removed via the vertical output pipe 21 through the housing wall as indicated by the arrow 93. Driving gas for the generator 35 is furnished over the gas input pipe 36 passing through the housing wall as is indicated by an arrow 95. The tub shaft 11 passes through a bearing 94 in the lower housing wall, which is preferably gas-tight. With this arrangement, gas evolved from liquid in the tub upon breaking foam in the axial region 41 may be retained by the housing 91 and controllably removed therefrom through a gas output pipe 96, as is indicated by an arrow 97. If desired, this pipe 96 may be connected to an evacuation pump (not shown), and the region inside the housing 91 may be operated at a partial vacuum. This arrangement is particularly suitable for separating and/or recovering noxious or valuable gases from a liquid.

For continuous operation of apparatus according to the invention, it is desirable, so to regulate the liquid input to and output from the apparatus, that the liquid level (38 in FIG. 1) remains substantially constant. It is obviously not desirable to permit the liquid level to fall so low that the scoops (24, 25 in FIG. 1) are exposed to gas or foam, or to rise so high as to occupy the axial region reserved for foam. In FIG. 5 which shows a tub 110 in partial vertical section, the liquid level is indicated at 138. The tub is open at the top 117. The input pipe 114 is fitted with an input control valve 115 (labelled $V_1$), and the output pipe 131 is fitted with an output control valve 132 (labelled $V_0$). These valves may be of the solenoid-operated type. The input control valve 115 is connected to an input control switch 116, while the output control valve 132 is connected to an output control switch 133. These may be micro-switches, for example. An input control lever 119 is pivotally mounted at 118 near the top edge of the tub, and is fitted at its lower end with a streamlined liquid sensor 120, which is located above the liquid level 138. An output control lever 134 is pivotally mounted at 135 near the top edge of the tub, and is fitted at its lower end with a streamlined liquid sensor 136 which is located at the desired liquid level 138. The input control level 119 is so arranged that, when its sensor 120 is out of contact with liquid in the tub, the input control valve 115 is open, and this valve is closed if the liquid in the tub rises sufficiently above the desired level 138 to make contact with the sensor 120. The output control level 134 is so arranged that, when its sensor 136 is out of contact with liquid in the tub, the output control valve 132 is closed, and this valve is opened when liquid in the tub rises to the desired level 138. Clearly, since the invention breaks foam in the axial region in the tub, there is no need to be concerned with any possible drag of foam on the levels 119 and 134 or on their respective sensors. It is also to be understood that the arrangement shown in FIG. 5 is but a schematic showing of the control arrangement.

An alternative arrangement for controlling the quantity of liquid in the tub, which is not illustrated, provides means effective to weigh the apparatus or the tub and its contents. Control valves, like the valves 115 and 132 are then operated in accordance with the gross weight, the input valve 115 being open and the output valve 132 closed when the gross weight is below a first prescribed limit, and vice versa when the gross weight is above a second prescribed limit. When the gross weight is between these two limits, both valves are open. A similar consideration is applicable to FIG. 5.

Stripping of unpolymerized monomer from a polymer latex raises many complications. Heat causes evaporation of water from the latex, high centrifugation causes settling out and coagulation with some polymers fire and explosion are substantial hazards and the surface tension of the latex is high enough to permanently trap some of the residual monomer gas within the mass.

A fast and effective method of monomer stripping is illustrated in FIG. 6 utilizing the combined centrifugal and elastic wave energy apparatus described in detail above.

The unstripped polymer latex is supplied through intake 150 regulated by flow control valve 151. The latex is heated above the vaporization temperature of the residual monomer by temperature controlled heating system 152 as the latex enters centrifuge tub 153. Heating system 152 can be any suitable heat exchanger, however, the direct introduction of steam has been found convenient in most instances. The high humidity resulting from the steam prevents excessive evaporation of water from the latex and reduces coagulation and equipment fouling. Tub 153 is rotated by motor 154 at a speed to provide 10 to 150 gravities of centrifugal force to latex 155. Latex 155 rises against the side walls of tub 153 due to the centrifugal force presenting a vertical surface facing the central axis of the tub. Ambient pressure in tub 153 is reduced by evacuation of the surrounding support chamber 156 through vacuum connection 157.

A gas or vapor is introduced through second inlet pipe 160 to drive a sonic transducer 161. The input gas is heated by heating system 162 which conveniently comprises a steam generator for entraining sufficient steam with the gas to achieve the desired temperature. Heat may also be added by heat exchanger apparatus. The gas for operating the transducer must be a compatible gas with respect to the specific polymer latex. Generally the gas of a monomer from which the polymer has been produced is suitable. However many monomer gases will liquify or freeze when gas expands through the transducer 161. An example is vinyl chloride monomer gas at 40 p.s.i., when allowed to drive a transducer, as shown herein for example, results in liquification and freezing of the gas; similar results are obtained when $CO_2$ is the driving gas. The addition of steam has been found particularly convenient since it serves two functions as follows:

(a) It furnishes heat loss in adiabatic expansion, and
(b) It solves the problem of vaporization of water from the latex, which otherwise produces some coagulation.

Steam alone is frequently satisfactory. Air introduces an explosion hazard in combination with some polymers but has been found suitable with many others. The gas is supplied to one or more transducers such as transducer 161 under a pressure of 20 to 40 p.s.i. The temperature of the gas exiting from the tranducer should be in the range of the vaporization temperature of the monomer. A range of 100° F. to 180° F. has been found generally suitable dependant on the particular latex being treated.

While the elastic wave transducer frequency is not particularly critical, the elastic wave energy must encounter the gas-liquid interface with enough intensity to rupture the interface. A gas-liquid interface generally reflects almost all elastic wave energy. However, with intensity of the order of 140 db above $2 \times 10^{-4}$ dynes/cm.$^2$ or greater, the elastic waves perturb and disrupt the surface of the liquid. The interface, being disrupted by the elastic wave energy, ceases to exist as a discontinuity between liquid and gas, thus permitting a susbstantial portion of the applied energy to enter the liquid.

The disruption of the surface is easily observed as a visible cloud of the atomized liquid erupting from the liquid surface. Stroboscopic observation of transparent fluids shows visible cavitation bubbles in the body of the liquid due to the entrance of substantial quantities of elastic wave energy in accordance with the principles described above. The elastic wave energy which has entered the liquid acts to assist in the degasification by literally shaking the bubbles loose from the liquid and helping to move them to the liquid gas interface. It has been observed that positioning elastic wave generators within several inches of the liquid gas interface provides the intensity levels required to disrupt the interface and assist the degasification.

In one practical example the degasification of a latex material was found to be complete when the transducers were positioned about 3 inches from the interface and activated with the suitable driving gas. The intensity level measured at the surface was 160 decibels above $2 \times 10^{-4}$ dynes (per square centimeter). Without the transducers more than 2% of the unreacted monomer gas remained in the liquid effluent from the apparatus.

Care must be taken in practicing the present method to maintain relative humidity inside the tub greater than 75%. This retards water evaporation from the latex, thus preventing film formation, and preventing changing the solids content of the latex. Steam introduced in heating the gas driving the elastic wave transducers can serve to maintain the humidity level.

The input temperature of the polymer latex is suitably in the range of 140° F. to 200° F. The upper limit is the temperature at which flocculation and/or coagulation becomes a problem and the lower limit depends upon the evacuation pressure of the monomer recovery system as applied at evacuation connection 157. As evacuation is increased, the vaporization temperature of the monomer is reduced lowering the temperature necessary for adequate stripping.

A pickup scoop 163 extending into the extreme outer annular portion 165 of tub 153 extracts the stripped polymer latex and delivers it through outlet piper 166 and regulator valve 167 to storage tanks or other destinations. Gaseous monomer is drawn off through evacuation connection 157. Values 151 and 167 are adjusted to maintain the appropriate liquid content in tub 153. Adjustments of these valves can be continuous and automatic by reference to weight, liquid level or other suitable reference as discussed in relation to FIG. 5. In the apparatus depicted in FIG. 6 it has been found that the most effective operation of the elastic wave energy takes place with transducer(s) 161 facing the vertical surface of the liquid in rotation and spaced in the order of three inches therefrom. Since the position of transducer 161 is essentially fixed in a given apparatus, the liquid level must be controlled to maintain this spacing. Obviously to prevent fouling of transducer 161 it must be positioned high enough in tub 153 to be above the horizontal liquid level during nonrotation. Inlet pipe 150 in the embodiment of FIG. 6 enters tub 153 at the top and extends through the vertical axis of the tub to its orifice 168 located adjacent to the bottom of the tub. While the spacing of the orifice with respect to the bottom of the tub is not critical, it is preferably close enough to prevent unnecessary splashing while spaced far enough not to restrict the inlet flow. This will vary with the size of the tub and will preferably meet the relation that the circumference of the inlet pipe multiplied by the distance of the pipe orifice from the bottom of the tub equals the circular area of the inlet pipe. It has been found that this axial liquid input to the bottom of the tub produces minimum input turbulence reducing the time required for processing. Turbulence can be reduced still further by the use of diffusing or distributing means for the incoming liquid. For example, conical diffuser 170 shaped as a solid cone with its apex rising toward the center of orifice 168 is helpful. Inlet pipe 150, transducer pipe(s) 160 and outlet pipe(s) 166 are all supported in fixed relation to one another by support plate 158 mounted at the top of outer enclosure 156. This arrangement provides ready access to the tub for cleaning as well as facilitating removal and addition of transducers, inlet and outlet pipes, inlet scoops, and level sensors. Any number of outlet scoops and sonic transducers may be inserted around the inlet pipe and it will be noted that the only rotational seal required is a gas seal at the point where the drive shaft enters through outer enclosure 156.

It is worth noting that the use of some steam for sonic transducer 161 keeps the transducer clean preventing fouling from foam or spray.

Following are some specific examples of monomer stripping in accordance with the invention. The apparatus used was essentially as illustrated in FIG. 6.

EXAMPLE I

A polyvinyl chloride (PVC) latex with entrained and dissolved unreacted vinyl chloride monomer greater than 1% by weight was run through the centrifuge. Steam was added in the inlet pipe to raise the temperature of the latex entering the centrifuge to 170° F. Four sonic transducers were driven by vinyl chloride monomer gas at 40 p.s.i. plus steam to raise the temperature at the transducer outlet to 120° F. The transducer frequency was ten kilocycles per second with an acoustic output of 200 watts each providing a total 800 acoustic watts. Pressure in the centrifuge was a vacuum of 15 inches mercury and relative humidity was 100% with excess fog. The tub of the centrifuge was 30 inches in diameter and 15 inches high. Rotation was 384 revolutions per minute with 23 gallons of liquid resident in the tub and a flow rate of 5 gallons per minute. The latex output contained less than 0.1% by weight residual unreacted vinyl chloride monomer and the coagulum was negligible.

EXAMPLE II

An acrylonitrile-butadiene-styrene (ABS) latex with entrained and dissolved unreacted acrylonitrile monomer 2% by weight was stripped of the monomer as above with the following differences. The transducer gas was air (note this creates a fire hazard with ABS and butadiene monomer gas is preferable for safety reasons). The latex input was at 190° F., transducer gas temperature was 150° F. Two transducers were used. Internal pressure was atmospheric. The tub dimensions were 18 inches diameter by 9 inches high with a residence liquid of three gallons and a rotation rate of 375 r.p.m. The flow rate through the system was one gallon per minute. The output latex had an acrylonitrile monomer content less than 0.05% with negligible coagulum.

EXAMPLE III

This example is butadiene monomer removal from styrene-butadiene-rubber (SBR) latex. The latex temperature was at 150° F. Unreacted butadiene content was reduced from 5% by weight to an unmeasurable amount. Other conditions identical to Example II.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:
1. A method of removing unreacted monomer from a polymer latex comprising:
   (a) centrifugating said latex in a centrifuge to the range of about 10 to 150 gravities;
   (b) heating said latex to at least the temperature at which the vapor pressure of the monomer to be removed is equal to the ambient pressure within said centrifuge;
   (c) during said centrifugating, irradiating the surface of said latex with sufficient gas-borne elastic wave energy to disrupt said surface with said energy; whereby said unreacted monomer is stripped from said latex; and
   (d) maintaining the relative humidity within said centrifuge above 75%.

2. A method according to claim 1 wherein said elastic wave energy is provided by a generator which is driven by a driving gas exhausted into said centrifuge, and said driving gas includes steam.

3. A method according to claim 2 wherein said driving gas is a mixture of steam and a second compatible gas.

4. A method according to claim 3 wherein said second compatible gas is a monomeric gas.

5. A method of removing unreacted monomer according to claim 1 wherein said elastic wave energy is applied from an elastic wave generator positioned within the centrifuge in the order of three inches from said surface.

6. A method of monomer stripping comprising:
    (a) running a polymer suspension through a centrifuge in which it is subjected to centrifugal acceleration in the range of 10 to 150 gravities;
    (b) while in said centrifuge, subjecting the surface of said suspension to concentrated gas-borne elastic wave energy sufficient to effect a transfer of a substantial portion of said energy through said surface;
    (c) heating said suspension entering said centrifuge to a temperature above the vaporization point for said monomer;
    (d) adding water vapor to said centrifuge sufficient to maintain the relative humidity in the centrifuge above 75%; and,
    (e) evacuating released monomer from said centrifuge.

7. A method of monomer stripping according to claim 6 wherein said relative humidity is 100% as a result of water vapor introduced with both said elastic wave energy and said suspension.

8. A method of stripping unreacted monomer from a polymer latex comprising:
    (a) heating said latex to the vaporization temperature of said monomer;
    (b) subjecting said latex to a centrifugal pressure of 10 to 150 gravities in a centrifuge while perturbing the surface of said latex with elastic wave energy from gas driven sonic transducers; and,
    (c) controlling the input and output flow rates of said latex so that the liquid level in said centrifuge during rotational operation is in the order of three inches from said sonic transducers.

References Cited
UNITED STATES PATENTS 3,163,508  12/1964  Tuck et al. _____ 55—178
3,213,592  10/1965  Rich _____ 55—178
3,218,782  11/1965  Litsios et al. _____ 55—178

MURRAY TILLMAN, *Primary Examiner.*

J. L. WHITE, *Assistant Examiner.*